Nov. 19, 1968   D. HEDERMANN   3,411,294
REVERSIBLE HYDRAULIC CONTROLLER, PARTICULARLY
FOR AUTOMOTIVE HYDRAULIC STEERING CONTROLS
Filed March 17, 1967   3 Sheets-Sheet 1

INVENTOR
DIETER HEDERMANN

Nov. 19, 1968    D. HEDERMANN    3,411,294
REVERSIBLE HYDRAULIC CONTROLLER, PARTICULARLY
FOR AUTOMOTIVE HYDRAULIC STEERING CONTROLS
Filed March 17, 1967    3 Sheets-Sheet 2

INVENTOR
DIETER HEDERMANN
BY *Stephen H. Frislauf*
*Atty*

INVENTOR
DIETER HEDERMANN

United States Patent Office 3,411,294
Patented Nov. 19, 1968

3,411,294
REVERSIBLE HYDRAULIC CONTROLLER, PARTICULARLY FOR AUTOMOTIVE HYDRAULIC STEERING CONTROLS
Dieter Hedermann, Immenstaad, Germany, assignor to Robert Bosch, G.m.b.H., Stuttgart, Germany, a limited-liability company of Germany
Filed Mar. 17, 1967, Ser. No. 624,036
Claims priority, application Germany, Apr. 9, 1966, B 86,624
6 Claims. (Cl. 60—52)

ABSTRACT OF THE DISCLOSURE

Manual or power steering control having a pair of chambers (FIGS. 3, 4, 5) which may be at equal or, alternatively, at high or low pressure, depending upon fluid displacement due to steering; a bore (67) interconnects these chambers in which a spindle valve (68) is located, establishing communication with a master leakage oil duct (76) and the chamber which is at the lower pressure, when the pressure differential between the chambers exceeds a pre-set spring pressure (71, 72); the controller may be used directly for control of a hydraulic steering cylinder (FIG. 4) or may be used with a power steering regulator (FIG. 5).

The present invention relates to a reversible hydraulic controller, particularly for hydraulic steering control of motor vehicles, which may act as a pump, or power fluid supply under pressure, and which is provided with a special valving arrangement to conduct leakage fluid to the hydraulic supply line having the lesser pressure.

Pumps, which also act as controllers for hydraulic systems, are difficult to construct if they are to be made so tight that no oil leaks past movable parts. To conduct the leakage oil back to the one, or the other of the supply lines to the controller, it has been proposed to insert spring loaded valves in communication with the supply lines, in order to lead off such leakage oil; U.S. Patent 3,051,091 discloses such an arrangement in connection with a gear pump. If the pressure of the leakage oil, within the leakage oil chamber, rises above a predetermined value, a connection to the chamber having a lower pressure opens automatically, in order to permit leakage oil to flow into the lower pressure line until the pressure within the leakage oil chamber has equalized with that of the originally lower pressure supply duct. The leakage oil is, however, always at some particular pressure and can be connected to the chamber having the lower pressure only when its pressure exceeds that of the closing pressure of a check valve. The pressure differential existing between the two input chambers in the regulator controller, alone, is insufficient to open a connection between the leakage oil connection chamber and any one of the input connections.

It is an object of the present invention to provide a reversible hydraulic controller which is versatile and can be used particularly as a hand pump for hydraulic steering controls, either directly or in combination with a power assist fluid circuit. The leakage oil compensation and connection should furthermore be as simple and free from difficulty as possible.

Subject matter of the invention

Briefly, the present invention relates to a hydraulic controller having a housing and a pair of pressure chambers, which may be at the same pressure or, depending upon the position of the control member, may be at unequal pressures, so that any one of the pressure chambers is adapted to be at an elevated pressure with respect to the other, to control or cause fluid flow from one to the other. The housing itself, particularly when adapted to form the control member for a hydraulic steering unit, has pump chambers in which fluid displacement bodies, such as small pistons, are mounted, the movement of which is controlled by a steeering wheel.

According to the present invention, a leakage valve is located in a bore interconnecting the pressure chambers and controlled by the higher of the pressures, to make a connection between a central or common leakage duct and the lower pressure chamber, when the pressure differential between the chambers exceeds a certain predetermined value, for example, exceeds a certain spring pressure.

The leakage valve itself is preferably formed as a spindle valve having a pair of outer lands, interconnected by a central, relieved section, in communication with the common leakage duct. As the spindle shifts between the chambers, communication can be established from the common leakage duct, over the central, relieved section and past one of the lands into the chamber having the lower pressure. When the valve is in its center, or neutral position, the two chambers of course are separated from each other.

The control according to the present invention can be used as a hand-pump in a closed hydraulic circuit; in case of an automotive hydraulic steering control, it is then connected to opposite sides of a steering cylinder. The controller can, however, also be used in a system having a hydraulic pump and a power assist, or power steering unit. In such a case, the two chambers are connected over a power controller to a motor-driven pump. The controller then supplies fluid under pressure to the steering cylinder. Either side of the reversible hydraulic control unit of the present invention can be connected to the motor-driven pump, and the pressure of this pump will then also be effective in the leakage chamber, or common leakage duct of the controller, so that the displacement pistons of the pressure controller, are relieved from pressure and can readily be moved by hand, whereas one side of the steering cylinder is under the pressure of both, pump pressure as well as the added pressure contributed by the control movement of the steering wheel. The other side, of course, of the steering cylinder will be relieved of pressure.

The structure, organization and operation of the invention will now be described more specifically in the following detailed description with reference to the accompanying drawings, in which.

Figure 1:
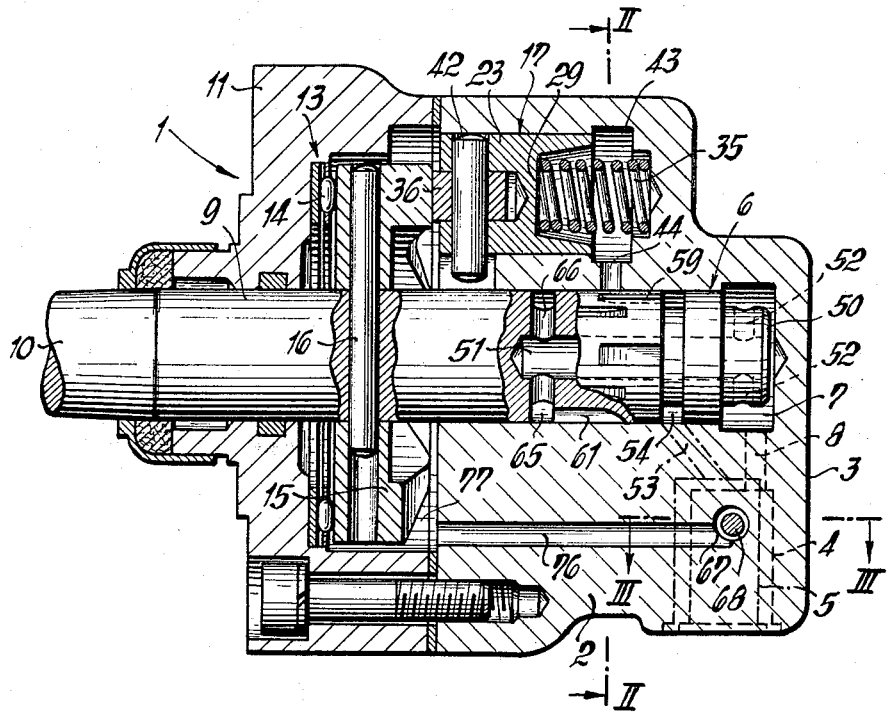
FIGURE 1 is a longitudinal sectional view of a controller according to the present invention.
Figure 3:
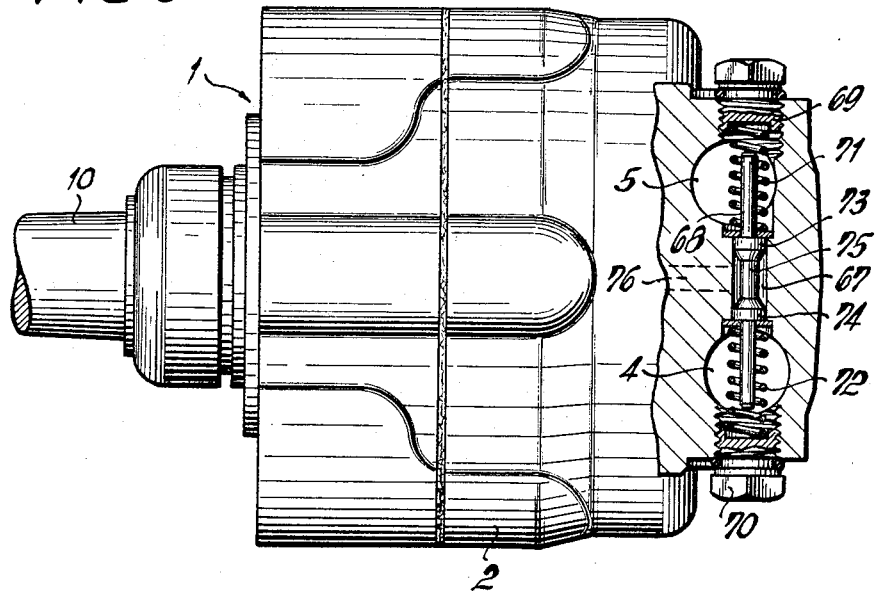
FIGURE 3 is a side view of the controller, partly in section according to lines III–III of FIGURE 1.

Referring now to the drawings and more particularly to FIGURE 1; the reversible control 1 is formed as a piston pump, having a housing 2; one end region 3 has a pair of bores, terminating in chambers 4, 5 therethrough (FIGURE 3), symmetrical with the longitudinal axis of the housing 2 but offset from each other, as clearly appears in FIGURE 3. A longitudinal bore 6, through the housing 2, has a chamber 7 as its inner end. Channel 8, communicating with the connecting bore 4, that is the bore closer to the surface 3, terminates in the chamber 7 (FIGURE 1).

A drive-shaft 9 formed as a control shaft and adapted to be connected to a steering post 10 of a steering wheel 12 (FIGURE 4) is rotatably secured within the longitudinal bore 6. Steering post 10 extends through a cover-plate 11, closing off the housing 2. Cover-plate 11 has a relief 13 on the side facing the housing 2, in which a thrust bearing 14 is located. A cam disc 15 bears against thrust bearing 14. Cam disc 15 is connected with the shaft 9 by means of a pin 16.

Figure 2:
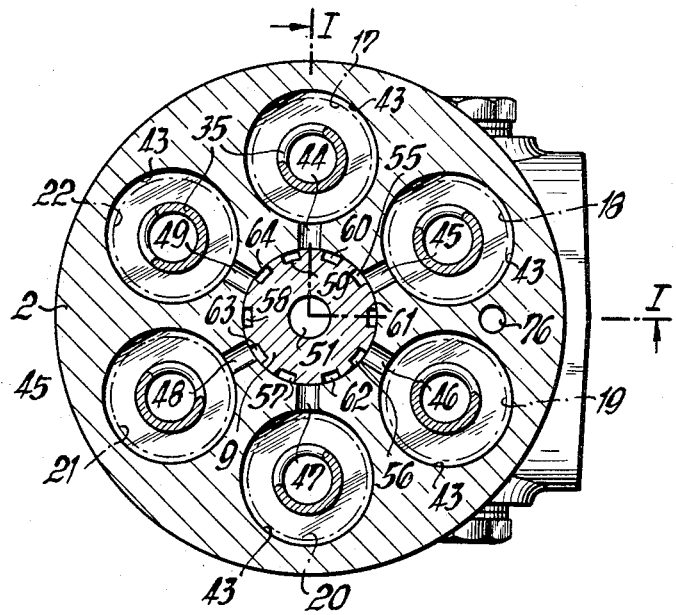
FIGURE 2 is a cross-sectional view according to line II–II in FIGURE 1.

Housing 2 further has six longitudinal bores 17–22 (FIGURE 2) located symmetrically with respect to each other and to the longitudinal bore 6. Each one of the longitudinal bores 17–22, forming small cylinders, contains a fluid-displacement body, or small piston 23–28. Pistons 23–28 can slide axially within the longitudinal bores; on the face towards the cam disc 15, each piston 23–28 has a small roller 36–41 connected by means of a pin 42 thereto, so that the pistons will slip back and forth depending upon the position of the cam disc 15. Springs 35, one for each one of the pistons 23–28, bear against the relieved other faces of the pistons 29–34. The pin 42, besides serving as a bearing for the rollers 36–41, further limits the movement of the pistons 23–28 by extending into a slightly enlarged portion of the bores 17–22, as clearly appears from FIGURE 1. Each bore 17–22, at its inner end, forms a chamber 43, to which a radial bore 44–49, one for each one of the chambers 43, connects. Bores 44–49 terminate in the axial bore 6 (FIGURE 1, FIGURE 2).

Shaft 9 (FIGURE 1) has an extension 50 of lesser diameter, located in chamber 7. A blind axial bore 51 extends from extension 50 in the interior of shaft 9, which connects with a cross-bore 52 in the extension 50. A duct or channel 53 terminates in the longitudinal bore 6 at about midway between the chamber 7 and a plane taken through the radial bores 44–49; duct 53 communicates with the connecting bore or chamber 5, as is schematically illustrated in FIGURE 1. A circumferential groove 54 on shaft 9 communicates with the duct 53. Further, five longitudinal grooves 55–59 are formed on the surface of the shaft 9 equi-distant thereover (FIGURE 1, FIGURE 2). They have approximately the depth of the groove 54, at their terminal end, and curve or taper towards the surface of the shaft 9 in the region of the radial bores 44–49 (FIGURE 1). Five further longitudinal grooves 60–64 are formed in the surface of the shaft 9, starting again opposite the radial bores 44–49, but terminating in the region of a second circumferential groove 65 (FIGURE 1, lower side of shaft 9). A cross-bore 66 in the region of groove 65 interconnects with the blind axial bore 51.

Housing 2 has a cross-bore 67 (FIGURE 3) interconnecting the chambers or bores 4, 5. A longitudinal spindle 68 is slidably, yet tightly, located in the bore so as not to permit escape of leakage oil. The cross-bore 67 is closed-off at its ends by a pair of cap bolts 69–70, which serve as longitudinal limits for the spindle 68, and further to hold one end, each, of a spring 71, 72, the other end of which bears against a washer, in contact (when the spindle 68 is at central position) with a pair of lands 73, 74 formed on the spindle 68, and retains the spindle 68 in its central position, as shown in FIGURE 3. Between lands 73, 74, spindle 68 has a relieved section 75, which is in constant communication with a leakage oil collection duct 76 (FIGURES 1, 3), which connects cross-bore 67 to chamber 77 within cover 11, and in which the cam disc 15 is located. Pistons 23–28, and rollers 36–41 further define a portion of the surface forming chamber 77. Connecting chamber or bore 4 can be connected to a suction line, and chamber or bore 5 to a pressure line, for a motor, not shown. The element shown in FIGURES 1 to 3 can then act as a pump. Hydraulic fluid is sucked up through chamber 4, reaches channel 8 and chamber 7, then through bores 51, 52, 66 of shaft 9 into circumferential groove 65 and then into the longitudinal grooves 60–64. Channel 53, within housing 2, connects the inlet chamber 5 with the circular groove 54 and with the longitudinal grooves 55–59 within the central shaft 9. In the position illustrated in FIGURES 1 and 2 in the drawings, hydraulic fluid is sucked into longitudinal grooves 60 to 64 and reaches radial bore 48, connected with longitudinal groove 63 as well as radial bore 49, connected with longitudinal groove 64, and then into chambers 43 of the longitudinal bores or small cylinders 21, 22 containing small pistons or movable elements 27, 28. The elements 27, 28 are passed by springs 35 towards the cam disc 15, so that rollers 40, 41 are almost on the base or depression between a pair of cam rises. The radial bores 47, 44, adjacent to the bores 48, 49 are separated from both the suction chamber as well as the pressure chamber in the particular position of shaft 9 shown in the drawings. Radial bores 45, 46 leading to chambers 43 of the longitudinal bores 18, 19, containing pistons or movable elements 24, 25 are connected to the pressure chamber 5 and then to the pressure line over duct 53 and longitudinal groove 54. Radial bore 45, longitudinal groove 55, and radial bore 56 connect with longitudinal groove 46.

Movable elements 24, 25 are pressed against the springs 35 by the cam disc 15 in the direction of chambers 43. Pressure fluid previously sucked into chambers 43 of the longitudinal bores 18, 19 thus can reach the motor over the connection just described. If shaft 9 is turned, cam disc 15 turns with it. Pistons 23–28, one after another, act as suction elements when chambers 43, at their sides 29–34 are connected to the suction line and when the spring 35 presses them against the depressions between rises in the cams formed on cam disc 15. Pressure fluid, sucked into these chambers, is then pumped through the pressure chamber to the motor, when chambers 43 are connected to the pressure line and the cams on cam disc 15 press the movable elements 23–28 against the force of spring 35, one after the other, into their longitudinal bores 17–22. When shaft 9 makes one complete revolution, six strokes by the pistons 23–28 will occur. If pump 1 is reversed, connection 4 can be connected to the pressure line and connection 5 to the suction line. When the hydraulic apparatus 1 of FIGURES 1 to 3 is not to be used as a motor, that is as a pump, but rather as a regulator or controller, either one of the connecting chambers 4 or 5 may be connected to a suction line and the other to a return line to a sump or fluid supply.

Leakage fluid can reach the space or chamber 77 from the circular groove 65 along the longitudinal bore 6, that is along the surface of shaft 9, as well as from chambers 43 along the surfaces and around pistons 23–28 within longitudinal bores 17–22. Depending on the pressure differential between the connecting chambers 4 and 5, the slider (spindle) 68 is pressed against the force of springs 71, 72 in the direction of the chamber having the lower pressure. For example, if the chamber 5 is the pressure chamber, slider (spindle) 68 will be moved downwardly (FIGURE 3) against the pressure of spring 72 in the direction of cap 70, so that the leakage fluid collection line 76 interconnects low pressure chamber 4 with chamber 77. Thus, chamber 77, faced by rollers 36–41 of pistons 23–28 will be at the suction pressure of the Unit 1.

Figure 4:
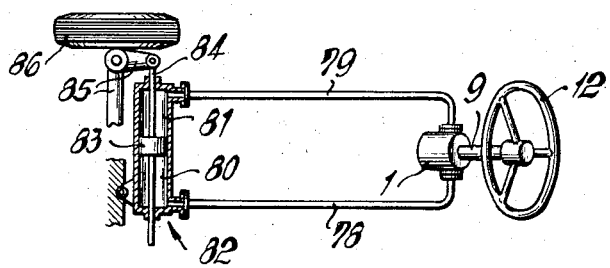
FIGURE 4 is a schematic fluid-circuit diagram of the controller in the hydraulic steering system for motor vehicles.

FIGURE 4 illustrates an example of the Unit 1 in combination with a hydraulic steering system, having a closed hydraulic circuit. The pump 1, in accordance with this embodiment of the present invention, has its shaft 9 secured to a steering wheel 12. Connecting bores 4, 5 are connected with lines 78, 79 which lead to both sides, 80, 81, of a steering cylinder 82. Steering cylinder 82 has a steering piston 83 slidable therein, which connects over a steering rod 84 with a steering linkage, schematically indicated at 85 only. Steering linkage 85 controls the position of wheels 86, only one of which is shown.

If the driver of a vehicle wants, for example, to turn the wheels towards the right, steering wheel 12 with its shaft 9 is turned towards the right (FIGURE 4). Thus, hydraulic fluid is taken from the cylinder, side 80, over lines 78, and then over connecting chamber 4, channel 8, chamber 7, bores 52, 51, 66, towards circular groove 65. From groove 65, hydraulic fluid connects with those chambers 43 which happen to be connected with their longitudinal bores 44, 49, to the longitudinal grooves 60-64 just matching the junction with the radial bores 44-49. As the wheel 12 is being turned, fluid will be pumped by the respective movable elements 23-28, operated by the rises in cam disc 15, through radial bores 44-49 and the longitudinal grooves 55-59 into circular groove 54, duct 53 and chamber 5, and then over line 79 to the right side 81 of the steering cylinder 82, moving the piston 83 towards side 80, until the pressure differential between sides 80, 81 on both sides of cylinder 82 is equalized. With motion of piston 83, steering rod 84 is moved in the direction towards side 80, and wheels 86 turn towards the right under pull of the steering linkage 85. If the vehicle is to be driven straight, steering wheel 12 is moved towards the left until, by reverse pumping, the piston 83 is again in its central position.

Figures 5, 6:
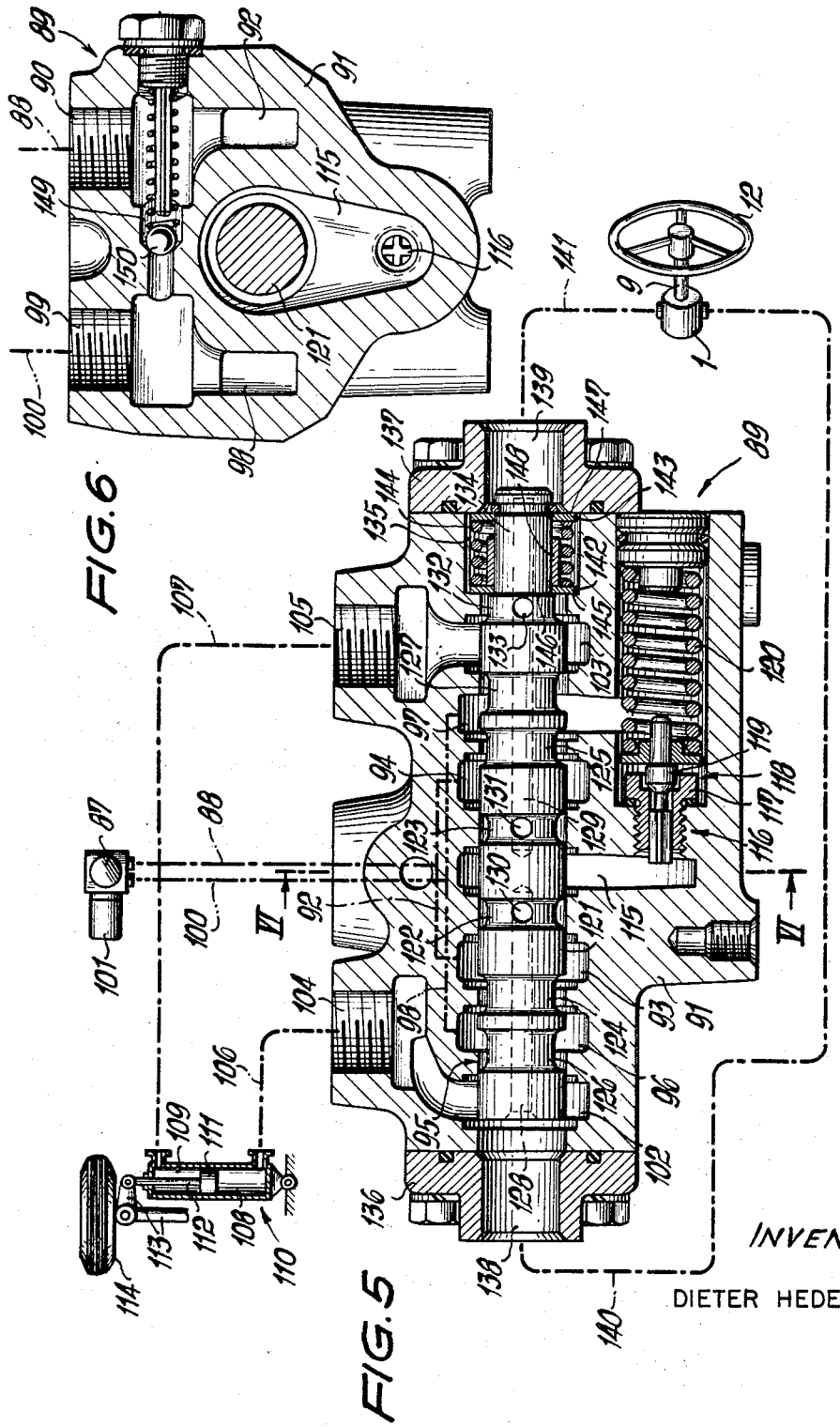
FIGURE 5 is a longitudinal sectional view of a regulator in combination with a controller of the present invention, and for use in a power-assist, or power steering system.
FIGURE 6 is a cross-sectional view through the regulator of FIGURE 5, on lines VI–VI thereof.

FIG. 5 illustrates a second embodiment of the invention. Element 1 acts as a motor or hand-controlled pump in combination with a hydraulic power steering regulator, and having an open hydraulic circuit. A motor-driven pump 87 is connected to a pressure line 88, leading to a regulator 89, having a housing 91, which will be described in detail below. It terminates in a bore 90, seen schematically only in FIG. 5, and shown in detail in FIG. 6. The regulator housing 91 has a duct 92 formed therein, which has a pair of relief grooves 93, 94, connecting with a central bore 95. Besides relief grooves 93, 94, which may be formed as circular grooves extending beyond the diameter of bore 95, a pair of further grooves 96, 97 are formed, connecting with a duct 98, shown dashed in FIGURE 5, and formed in housing 91. Duct 98 connects with a bore 99 (FIGURE 6) which connects with a return line 100 to a sump 101, communicating with the suction side of pump 87. Bore 95 has a pair of further circular grooves 102, 103, each connecting with a bore, 104, 105. A pair of power connections, 106, 107, connect with bores 104, 105, each leading to a side 108, 109 of a steering cylinder 110, having a piston 111 therein, provided with a piston rod 112. Piston rod 112 is connected by a steering linkage system 113, shown schematically only, to wheels 114 of a vehicle.

A notch 115 is formed between the grooves 93, 94, connecting with the pressure line 88; notch 115 communicates with bore 95, and further with a bore 116 which connects with the return line 100 and circular groove 97. Bore 116 contains the seating element 117 of a pressure-limiting valve 118, having a closure element 119 which is pressed by a comparatively strong spring 120, retained in an enlarged section of bore 116, against seat 117.

A longitudinally slidable control spindle 121 is located snugly, so that there is no leakage, within bore 95. A pair of inner longitudinal grooves 122, 123 are so arranged that, depending upon the position of spindle 121, they connect with either grooves 93, 94 (connected to pressure line 88) or with the recess 115; or, in the alternative, separate the aforementioned grooves and the recess. The longitudinally slidable spindle 121 has a pair of further, intermediate grooves 124, 125, which, depending upon the position of the spindle 121, connect either with grooves 93, 94 (connected to pressure line 88) or with grooves 96, 97 (connected to return line 100). A further pair of outer grooves 126, 127 are formed on the spindle 121 which, again depending upon the position of the spindle, open or close connection between grooves 96, 97 or grooves 102, 103 (connected to power lines 106, 107). Each end of the spindle 121 is formed with a blind bore 128, 129, which, close to its inner end connects by means of cross-bores 130, 131 with circumferential grooves 122, 123. A circumferential relief 132, formed on spindle 121, either communicates with or is separated from a recess 103, connected to power line 107. Relief 132 is formed with a cross-bore 133, which connects with the blind bore 129. The section of the spindle next to relief 132 is formed with a small end portion 134, having a smaller diameter than the relief. It extends into an enlarged end-piece 135 of the bore 95. The terminal section 135, and the other end of bore 95 are sealed and closed by covers 136, 137, each of which is formed with an opening 138, 139, to which the two control lines 140, 141 are connected, which again terminate in the chambers 4, 5 of Unit 1 as indicated in FIGURE 5.

The extension 134 on spindle 121 has a pair of washers, 142, 143 applied thereto, slidable on the extension. A pressure spring 144 is arranged between the washers, which, depending upon the position of the spindle 121 either presses washer 142 against a shoulder 145 of the bore 95 in the housing or against a shoulder 146 of spindle 121; and further presses washer 143 against the cover 137 or against a projection 147, which may be formed as a C-ring secured near the end of the extension 134.

In addition, a longitudinal slidable sleeve 148, slightly less long than the distance between washers 143, is arranged beneath spring 144 and over the extension 134 in order to limit the travel of the spindle 121.

A communication channel 149 interconnects bore 90 with bore 99 (connected to the return line 100). Bore 149 contains a suction valve 150, which can open to bore 90 of the pressure line 88.

FIGURE 5 illustrates spindle 121 in its central, or neutral, position. In this position, the hydraulic fluid is pumped by pump 87 through pressure line 88, bore 90, duct 92, into grooves 93, 94, and from there through circumferential grooves 124, 125, grooves 96, 97, duct 98 and bore 99 back to the return line 100 and to sump 101. The pressure lines 106, 107 to the steering cylinder 110 connect over bores 104, 105 to grooves 102, 103. In the position shown, they are separated from the pressure and return lines 88 and 100. The control spindle 121 can, however, open a connection between groove 102 and the control line 140 connected to opening 138 in cover 136, to furnish a connection to pump 1; groove 103, over relief 132, cross-bore 133, blind bore 129, and opening 139 in cover 137 connects with control line 141 to pump 1.

Let it be assumed that the vehicle is driven fast on a good road, so that only small steering forces are necessary to act on the wheels of the vehicle. Steering is direct and no power assistance is necessary. Forces from the wheels 114, applied over the sides 108, 109 of the steering piston 111, and applied to chambers 43 of pump 1 are counteracted by the driver by rotation of the steering wheel 12, by holding the cam disc 15, and thus the movable elements or pistons 23-28 and with it the steering piston 111 with wheels 114, in their neutral position. If the driver, after having made a turn with wheel 12, releases the wheel, the wheels themselves can return to center position due to their camber and toe-in; further, by means of cylinder sides 108, 109 and chambers 43, cam disc 15 is brought back to central position by movable elements 23-28 acting thereon. This also returns the shaft 9 and with it steering wheel 12 to their central position.

If the driver wishes to cut the wheels and the counteracting forces are small, wheel 12, via shaft 9, and cam disc 15 will shift the position of pistons 23-28. The small pressure differentials which arise in chambers 43, and side 108, 109 of the steering cylinder 110 would be sufficient to move the steering piston 111, and with it wheels 114 of the vehicle to the desired position. The spindle 121 (FIGURE 5) of the regulator unit 89 stays in its neutral, central position, shown in FIGURE 5 under all the aforementioned driving conditions, because when only small steering forces are necessary, the pumping action to obtain pressure equalization within the chambers 43, and with it control lines 140, 141, is too small to overcome the strength of spring 144, so that spindle 121 cannot move out of its neutral position. The strength of this spring 144 is so chosen that power assistance to steering is provided only when greater steering effort is needed.

If a larger steering effort is necessary, for example when the wheels are cut completely or when the vehicle is moving slowly, or when the road conditions are such that the wheels can be turned only with effort, that is when a substantial resistance is encountered to cut the wheels, then the power assistance will become effective. If the driver, by turning steering wheel 12, turns cam disc 15, and pistons 23–28 move, then the pressure in the chambers 43 which are then connected to control line 144 (FIGURE 5) rises; further, the pressure on side 109 of the steering cylinder 110, connected over regulator 89, will rise, as above explained. When the pressure rises to such an extent that the difference of the forces at the end surfaces of the spindle 121 exceeds the force of spring 144, spindle 121 will shift from the neutral position shown in FIGURE 5; if the pressure in line 141 rises, spindle 121 will move towards the left in FIGURE 5. Chambers 43, connected to control line 141 remain connected to the side 109 of the steering cylinder 110 as before. However, those chambers 43 which are connected to the control line 140 are separated from side 108 of the steering cylinder 110. In its stead, fluid will be supplied through groove 123, bores 130, 128, and opening 138 to control line 140, and then to pump 1 through connecting chamber 4 and duct 8 (FIGURES 1 and 2) chamber 7, bores 52, 51, 66, circumferential groove 65 and those radial bores connecting with their corresponding longitudinal grooves. Thus, hydraulic fluid from pump 87 (FIGURE 5) is supplied to those chambers 43 connected to control line 140, in which the pressure rises and where the pistons in chambers 43 are moved towards the cam disc 15, so that Unit 1 will act as a hydraulic motor, thus further assisting in the motion of the steering piston 111, until the pressures acting on the end surfaces of spindle 121, adjacent opening 138, again return the spindle 121 to its neutral position. Side 108 of the steering cylinder 110 is connected over line 106, bore 104, groove 102, and circumferential groove 126 to groove 96 which connects with the return line 100, which is without pressure so that hydraulic fluid can return from side 108 to the sump 101 and the steering piston 111 can be moved by the pressure acting on side 109 in the direction towards side 108, in order to move the wheels 114 in the desired direction by means of the steering linkage. When the desired position of the wheels is reached, then the control line 140 is again separated from a pressure connection and instead connected to side 108 of the steering cylinder 110. With steering in the opposite direction, the same general operation will result, with the spindle moving in the opposite direction.

Any leakage fluid arising within pump 1 is, as previously described, always connected by means of slider (spindle) 68 to the one connecting chamber 4, 5 having the lesser pressure. Thus, the pressure within the space 77 will be the pressure of pump 87 (FIGURE 5). The pressure differential between the suction pressure in space 77, and the pressure caused by the various movable elements 23–28 within pump 1 is rather small. Thus, even if the amount of leakage is relatively small, the manufacturing tolerances in the production of units of pump 1 need not be extremely precise. Further, the pressure in space 77 acts equally on all the movable elements 23–28, so that they need not be sealed with respect to each other. The longitudinal slider 68 thus has two functions: it interconnects the central leakage duct 76 with the particular chamber 4 or 5 which is at lower pressure and further, it permits communication with the space 77, fronting on the end faces of movable elements 23–28, to put them under suction.

If the motor-driven pump 87 should, for some reason, not be operating, or is not driven, for example if the vehicle is to be towed, then element 1 will operate as a hand pump. Just as in normal steering, when spindle 121 is in its neutral or central position (FIGURE 5) chambers 43 connected to the control lines 140, 141 then interconnect with the respective sides 108, 109 of the steering cylinder 110. Grooves 93, 94, connected to the pressure line 88, are connected over grooves 124, 125, with recesses 96, 97 for the return and are without pressure. If the driver wishes to cut the wheels, for example towards the left, and moves steering wheel 12 towards the left, so that with it shaft 9 and cam disc 15 rotate, movable elements 23–28 push hydraulic fluid into control line 140, and with it to side 108 of steering cylinder 110, in which side 108 the pressure will rise. With it, the pressure against the side of the spindle 121, extending into opening 138, will likewise rise. When the pressure differential at the faces of spindle 121 exceeds the force of spring 144, spindle 121 will move from its central position (FIGURE 5) to the right and separate grooves 93, 94 connected to the pressure line 88, as well as grooves 96, 97 connected to the return line 100. Side 109 of the steering cylinder is then separated from connection with chambers 43 (over line 141) having a lower pressure and, rather, is connected over circumferential groove 127 with groove 97 connecting with return line 100. Side 109 of the cylinder 110 is thus without pressure and chambers 43 connected to the control line 140 causing a higher pressure, move the steering piston 111 to the side 109 of the steering cylinder 110. The control line 141 is, in this mode of operation, connected with pressure line 88 by means of groove 94, circumferential groove 122, and bores 131, 129. Since pump 87 does not supply hydraulic fluid under pressure, suction valve 150 will permit fluid to be sucked over bore 90 in the communication duct 149 from sump 101 and through the return line 100, to supply the control line 141. If it is desired to steer the vehicle in a straight path, the driver again moves steering wheel 12 which rotates shaft 9 and cam disc 15 will move movable elements 23-28, with assistance of the higher pressure existing in the control line 140. Control line 141 will have hydraulic fluid supplied from pump 1, the pressure will rise therein whereas the pressure within line 140, serving as a suction line will drop. When the pressure differential in the lines 140, 141 becomes less than the force of the spring 144, control spindle 121 again returns to its neutral position. Both lines 140, 141, and chambers 43 of pump 1 are then again connected to the respective sides 108, 109 of the steering cylinder 110, and until larger steering forces are necessary, the vehicle is steered directly, that is without any power assistance.

Wheels 114 may be subject to sudden deflecting forces, so that, for example, the piston 111 is moved suddenly to side 109 of the steering cylinder 110. This will cause on side 109, and with it in groove 132 and opening 139 a sudden pressure pulse. The control spindle 121 is thus moved out of its central or neutral position (FIGURE 5) towards the left, so that cylinder side 109, and with it bores 133, 129, 131, are connected to the groove 115, and the valve body 119 of the pressure limiting valve 118 is lifted from its valve seat 117. Hydraulic fluid can thus escape through the open over-pressure valve 118 to groove 97 connected to the return line 100.

If sudden pressure pulses should arise on the side 108 of the power cylinder, pressure pulses arising at the side of control spindle 121 which is close to opening 138 will shift spindle 121 to the right. Hydraulic fluid can flow through bores 128, 130, circumferential groove 123, groove 115, and open valve 118 back to return line 100.

I claim:

1. In a reversible hydraulic controller comprising a housing (11), a pair of pressure chambers (4, 5) formed in said housing, each pressure chamber being adapted to be at elevated pressure with respect to the other at any one time to provide for reversal of fluid flow; hydraulic connection means to connect said pressure chambers (4, 5) into a hydraulic system; pump chamber means (43, 17–22) formed in said housing; fluid displacement bodies (23–28) movably located in said pump chamber means (17–22); manually displaceable control means (9, 10, 15) movably located in said housing for enagement with said fluid displacement bodies (23–28) to displace the relative position of said bodies in said pumping chamber means (17–22) and thus pump hydraulic fluid upon movement of said manually displaceable control means (9, 10, 15); a leakage valve (68) located in said housing; and leakage duct means (76) in communication with said leakage valve (68);

the improvement wherein said leakage valve (68) is located between said pressure chambers (4, 5) and controlled by the higher of the pressures within said pressure chambers (4, 5) to interconnect said leakage duct means (76) with the pressure chamber having the lower pressure, independently of the pressure within said leakage duct means (76).

2. A hydraulic controller as claimed in claim 1, wherein said leakage duct (76) terminates opposite a central portion of said leakage valve (68).

3. A hydraulic controller as claimed in claim 1, wherein said housing is formed with a leakage valve bore (67) interconnecting said pressure chambers (4, 5) said leakage valve including a spindle (68) located in said bore and having a pair of end portions (73, 74) separating said pressure chambers (4, 5), said spindle (68), when in central position within said bore, interrupting communication between said pressure chambers (4, 5) as well as between said leakage duct (76) and any pressure chamber.

4. A hydraulic controller as claimed in claim 3, wherein said spindle (68) has a central portion (75) of reduced diameter; spring means (71, 72) are provided maintaining said spindle in center position when a differential pressure does not exist in said pressure chambers (4, 5) in excess of the strength of said spring means (71, 72); said leakage duct terminating in the region of said reduced, central portion (75).

5. A hydraulic controller as claimed in claim 1 in combination with a vehicle-steering system, said manually displaceable control means including a steering wheel (12; FIGURE 4); a hydraulic steering means (80, 81, 82) for the steered wheels of said vehicle; and means interconnecting the pressure chambers (4, 5) and said hydraulic steering means.

6. A hydraulic controller in the combination claimed in claim 5, in further combination with a power-steering system (FIGURES 5, 6) having a power-steering regulator (89) and a power pump (87); said means interconnecting said pressure chambers (4, 5) and said hydraulic steering means including first connections (140, 141) from said pressure chambers (4, 5) to said regulator (89); and second connections (106, 107) from said regulator (89) to said hydraulic steering means (110).

References Cited

UNITED STATES PATENTS

| | | |
|---|---|---|
| 3,271,954 | 9/1966 | Marsec et al. |
| 3,333,416 | 8/1967 | Budzich. |
| 3,347,041 | 10/1967 | Bahniuk et al. |

FOREIGN REFERENCES

| | | |
|---|---|---|
| 1,201,177 | 9/1965 | Germany. |

EDGAR W. GEOGHEGAN, *Primary Examiner.*